Inventors
Walter G. Rawls.
Vaughn Rawls.

Jan. 9, 1940.  W. G. RAWLS ET AL  2,186,882
TIRE RETREADING MACHINE
Filed June 23, 1938   5 Sheets-Sheet 2
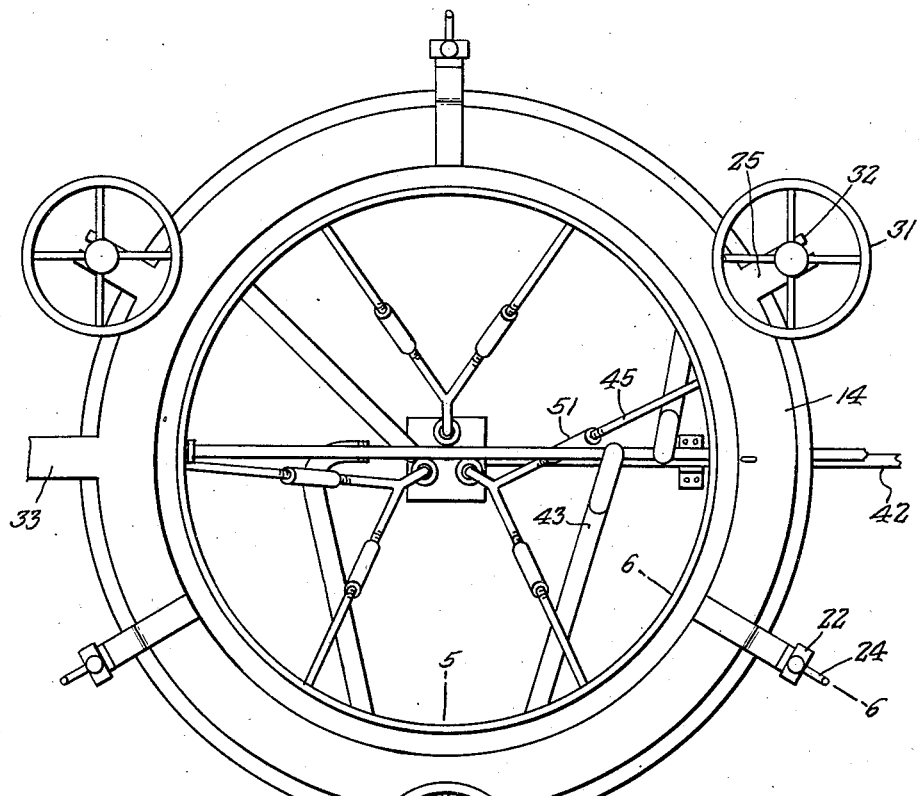
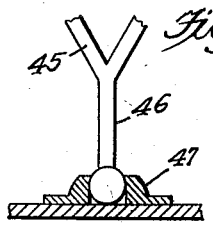
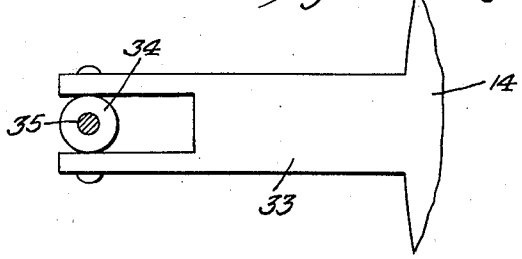
Inventors
Walter G. Rawls,
Vaughn Rawls,
By Clarence A. O'Brien
and Hyman Berman
Attorneys Jan. 9, 1940.    W. G. RAWLS ET AL    2,186,882
TIRE RETREADING MACHINE
Filed June 23, 1938    5 Sheets-Sheet 4
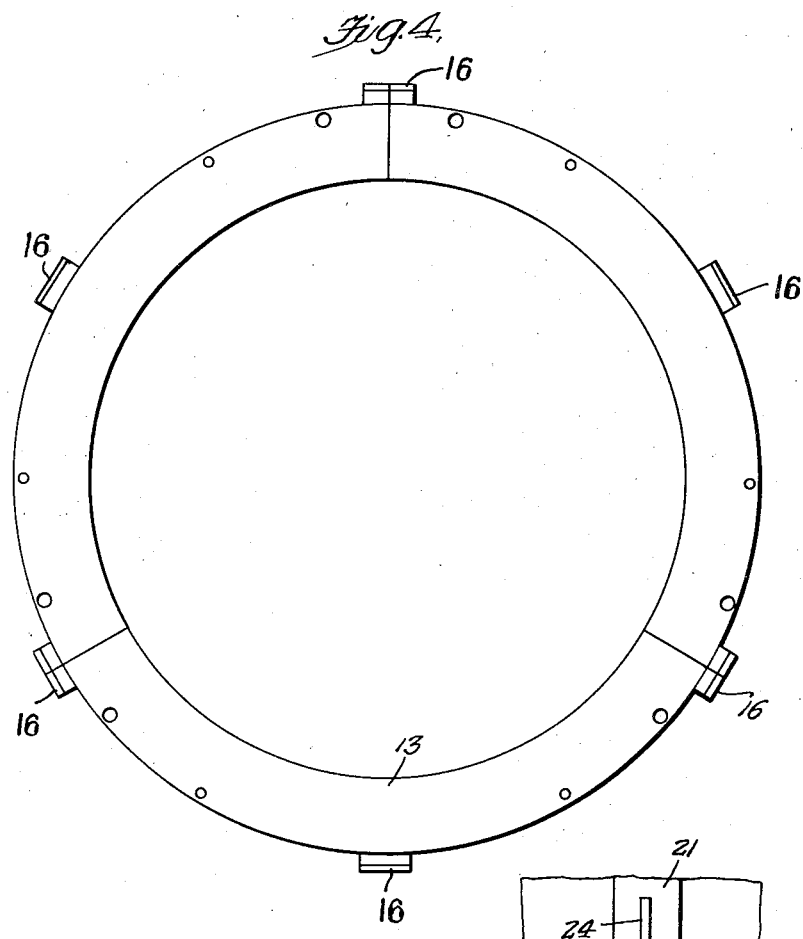
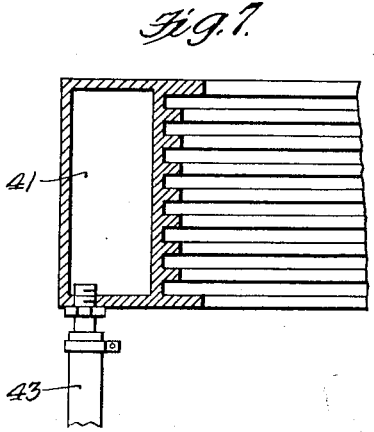
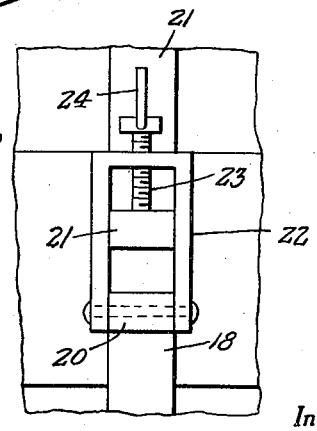
Inventors
Walter G. Rawls,
Vaughn Rawls,
By Clarence A. O'Brien
and Hyman Berman
Attorneys

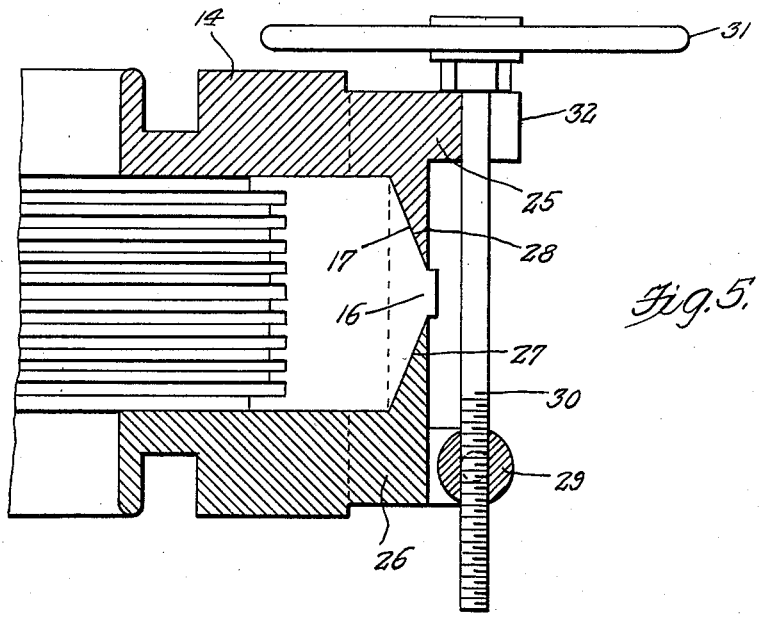
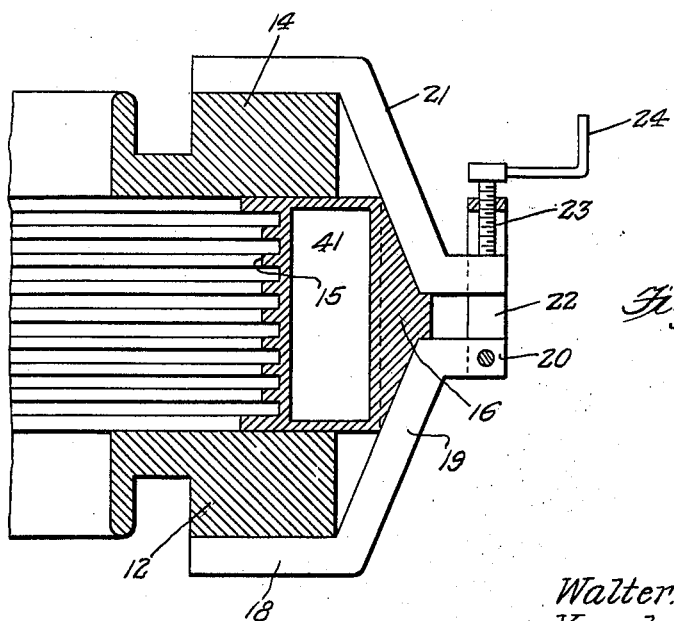

Patented Jan. 9, 1940

2,186,882

UNITED STATES PATENT OFFICE 2,186,882

TIRE RETREADING MACHINE

Walter G. Rawls and Vaughn Rawls, Lima, Ohio

Application June 23, 1938, Serial No. 215,497

4 Claims. (Cl. 18—18)

This invention relates to a tire retreading machine and has for the primary object the provision of a device of this character which is so constructed as to permit easy and quick retreading of a carcass of a tire mounted on a motor vehicle wheel and inflated to a desired pressure and includes a sectional steam-heated matrix with coacting ring members which will support the tire in proper position for the tread material which has been previously applied to the carcass of the tire to be cured in proper shape to give the tire a finished appearance and with a tread capable of providing long and efficient service.

Another object of this invention is the provision of conveniently operated means for drawing the sections of the matrix together in proper alignment to each other and against the tire with a maximum amount of pressure.

A further object of this invention is the provision of an easily operated means for separating and raising the sections of the matrix after the release of said sections so that the retreaded tire and the vehicle wheel on which it is mounted may be conveniently lifted from the matrix.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a tire retreading machine constructed in accordance with our invention.

Figure 2 is a top plan view showing the device.

Figure 4 is a bottom plan view of the matrix.

Figure 5 is a fragmentary transverse sectional view showing one of the clamping means for the matrix, and taken on line 5—5 of Figure 2.

Figure 6 is a view similar to Figure 5 showing another one of the clamping means for the matrix, taken on line 6—6 of Figure 2.

Figure 7 is a sectional view taken on the line 7—7 of Figure 1.

Figure 8 is a fragmentary side elevation illustrating one of the clamping means for the matrix.

Figure 10 is a detail sectional view taken on the line 10—10 of Figure 1.

Figure 11 is a detail sectional view taken on the line 11—11 of Figure 3.

Figure 1:
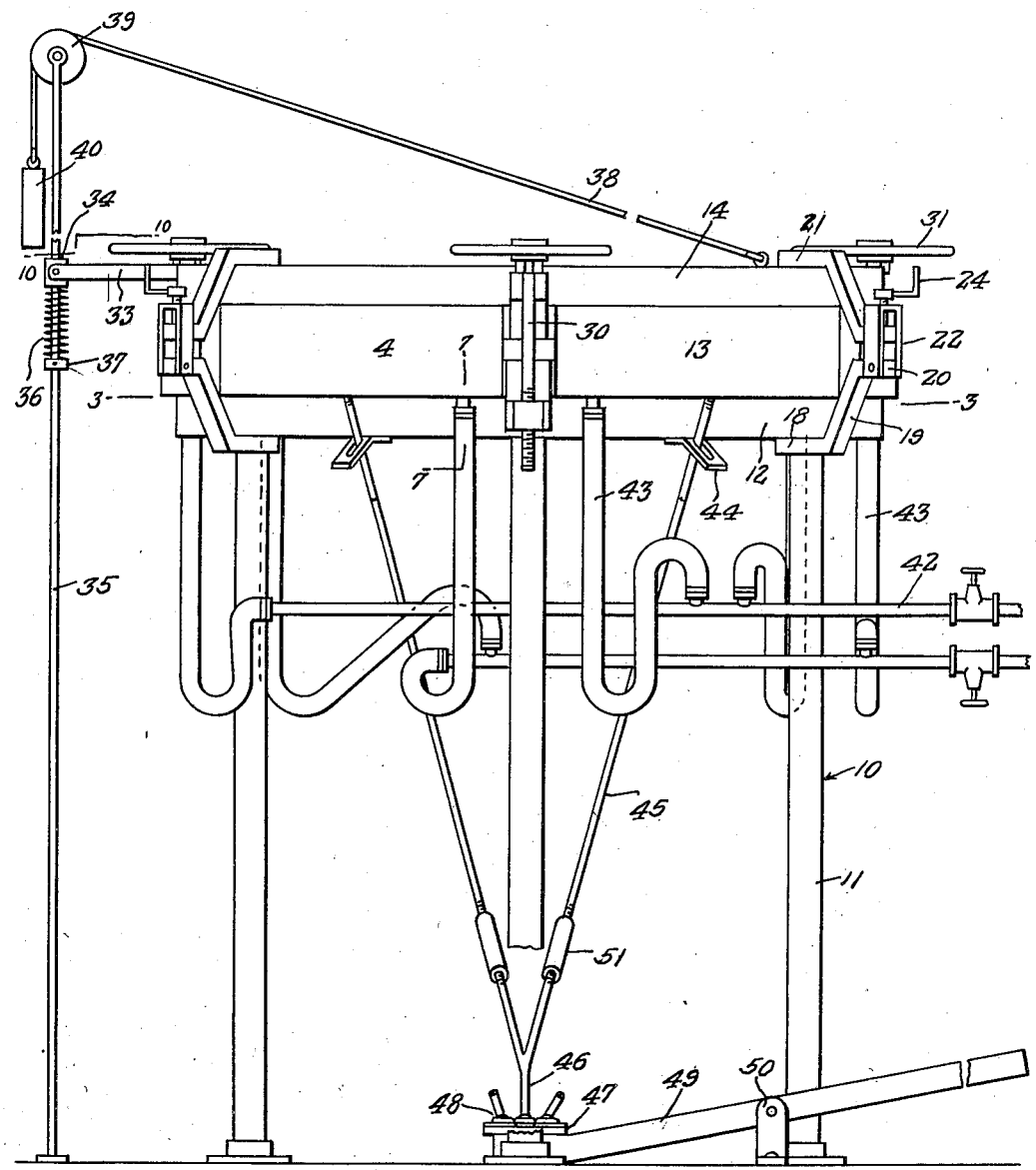
Figure 3:
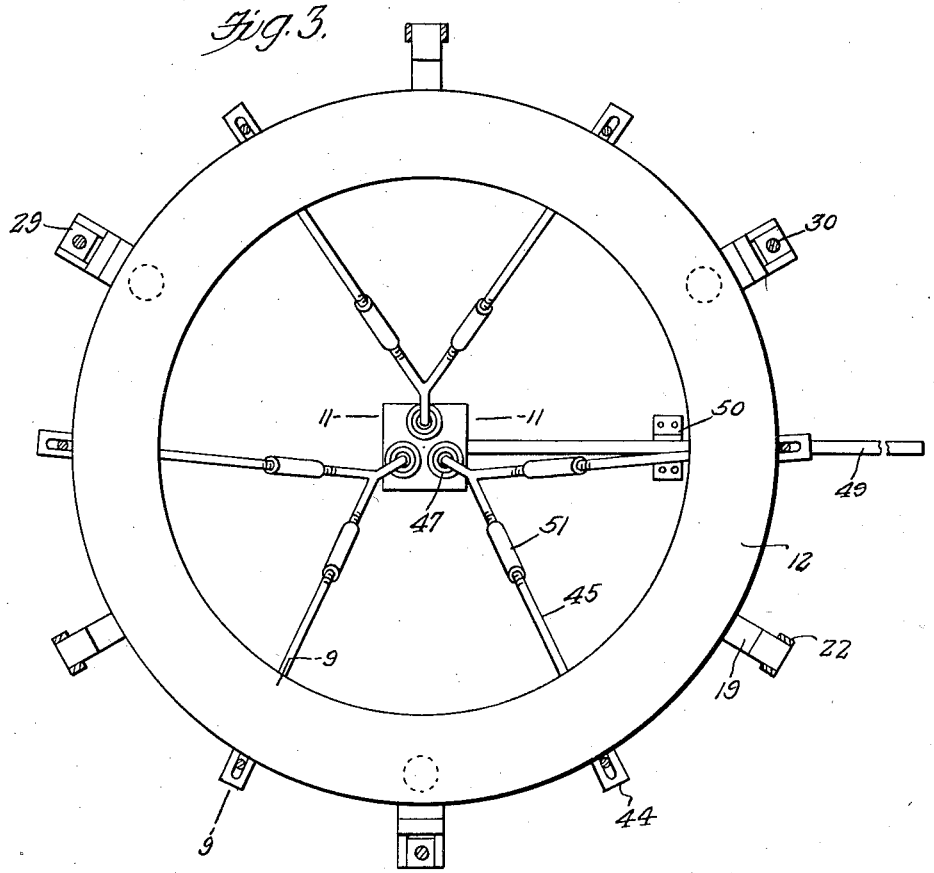
Figure 3 is a sectional view taken on line 3—3 of Figure 1 showing the lower ring member and the forks employed for lifting and spreading the sections of the matrix.
Figure 12:
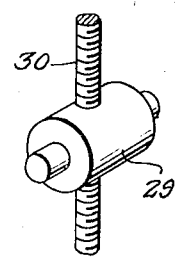
Figure 12 is a fragmentary perspective view illustrating one of the feed stems and its coacting feed nut.
Figure 9:
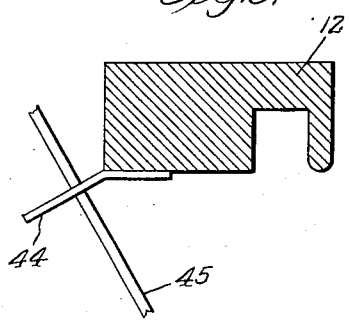
Figure 9 is a detail sectional view taken on the line 9—9 of Figure 3.

Referring in detail to the drawings, the numeral 10 indicates a stand consisting of supporting legs 11 on which is fixed a lower ring member 12 forming a case or support for a matrix 13. A ring member 14 similarly constructed to the ring member 12 is arranged to rest upon the matrix 13 and is so mounted that it may be conveniently moved off of the matrix and which will be hereinafter more fully described.

The matrix has its inner face ribbed, as shown at 15, for forming on a retreaded tire a desired non-skid surface. The matrix is composed of a plurality of sections as clearly illustrated in Figure 4 and formed on the sections are lugs 16 having oppositely beveled faces 17. Some of the lugs are located adjacent the ends of the sections while the other lugs are located substantially intermediate the ends of said sections.

Formed on the lower ring member 12 are arms 18 having upwardly and outwardly inclined portions 19 terminating in angularly disposed clamp attaching portions 20. The upper ring member 14 is equipped with arms 21 similarly shaped to the arms 18. Yokes 22 are pivoted on the attaching portions 20 of the arms 18 and have threaded thereto stems 23 provided with handles 24 for the convenient rotation thereof. To clamp the matrix between the upper and lower ring members the yokes 22 are brought over the arms 21 and the stems 23 turned thereagainst. The matrix is then firmly clamped on the support.

The arms 21 depend downwardly and outwardly while the arms 18 extend upwardly and outwardly. The inclination of said arms 18 and 21 is so as to match the beveled faces of certain of the lugs formed on the matrix.

Upper and lower jaws 25 and 26 are formed on the upper and lower ring members. The jaws 26 include upwardly and outwardly inclined faces 27 while the jaws 25 include downwardly and outwardly inclined faces 28. The faces 27 and 28 of the jaws contact the beveled faces of the other lugs of the matrix. The jaws 25 and 26 when drawn towards each other have a wedging action against the matrix for the purpose of drawing the sections of the matrix together with the sections in proper alignment with each other. Nuts 29 are pivoted on the jaws 26 and feed shafts 30 thread therein. The feed shafts are equipped with hand wheels 31 for the convenient rotation of said shafts in either direction. The jaws 25 have forked portions 32 to receive the shafts 30 with the hubs of the hand wheels 31 bearing thereagainst so that when the shafts are rotated in one direction the jaws will be drawn in the direction of each other and when rotated in an opposite direction the jaws will be released from each other and also will permit the shafts 30 to be moved out of the forked portions of the jaws 25, thereby permitting the upper ring member 14 to be lifted off of the matrix.

A hinge arm 33 is formed on the upper ring member 14 and is pivoted on a block 34 slidably mounted on a supporting rod 35. The block 34 seats on a coil spring 36, the latter being mounted on the supporting rod 35 with one end in engagement with a stop collar 37 secured on the supporting rod 35 with the other end bearing against the block 34. This construction provides a hinge structure for the upper ring member on the supporting rod 35 capable of having a limited yieldable sliding movement on said supporting rod. A cable 38 is secured on the ring member 14 opposite the hinge arm 33 and is trained over a pulley 39 carried by the upper end of the supporting rod 35 and has secured thereto a weight 40 for aiding in swinging the upper ring member on its hinge structure.

The matrix 13 or each section thereof has a steam chamber 41 connected to steam supply pipes 42 by flexible pipes 43. The steam chambers 41 permit heating of the matrix and thereby cure the tread of the tire arranged in the matrix.

Slotted guide brackets 44 are secured on the lower ring member 12 and slidably support substantially V-shaped push members 45, the upper ends of which contact with the lower wall of the matrix while the apexes of said members 45 are in the form of shanks 46 connected to a plate 47 by ball and socket joints 48. The plate 47 is secured on one end of an operating lever 49, the latter being pivotally mounted on a fulcrum 50. By depressing the free end of the lever the push members 45 will slide upwardly imparting upward movement to the matrix to lift the latter off of the lower ring member 12 and the arms and jaws carried thereby. As the matrix is lifted upwardly the jaws and arms of the lower ring member bring about separation of the sections of the matrix, thereby increasing the internal diameter of the latter so that a tire mounted on a wheel can be easily placed in and removed from the matrix. The push members 45 are provided with turn buckles 51 whereby the length of said push members may be increased and decreased for the purpose of regulating the distance in which the matrix may be lifted through the depression of the free end of the lever 49.

In operation, the upper ring member 14 is swung upwardly on its hinge structure and maintained in its elevated position by the weight 40. A tire which has been prepared with retread material is then mounted on a motor vehicle wheel and inflated to a desired pressure. The tire and wheel is then positioned in the matrix with the latter in an elevated position by depressing the free end of the lever 49. After the tire and wheel has been properly positioned in the matrix the operating lever 49 is freed and the upper ring member 14 is swung downwardly into engagement with the tire forcing the tire into proper position within the matrix. The yokes 22 are then brought over the arms 21 and the stems 23 rotated against the arms 21 drawing the ring member tightly down on the tire and forcing said tire into proper position within the matrix. Also the hand wheels 31 after the positioning of the shafts 30 in the forked portions 32 of the jaws 25 are rotated. Through the rotation of the shafts 30 and the stems 23 the sections of the matrix are forced inwardly to decrease the internal diameter of the matrix and bring said sections in proper alignment and in abutting engagement with each other applying onto the tire considerable pressure proper for molding the tread material into proper shape. Steam is then admitted to the steam chambers for cooking the retreading material and after the latter has been properly cured the steam is turned off. The upper ring member 14 is then released through the operation of the hand wheels 31 and crank handles 24. After the upper ring member has been freed from the matrix it is swung upwardly and the free end of the operating lever is depressed imparting an upward movement to the matrix bringing about expansion thereof due to its engagement with the lower jaws and arms of the lower ring member. The matrix in its expanded position permits the cured tire and the vehicle wheel to be easily lifted out of the matrix.

It is believed that the foregoing description, when taken in connection with the drawings will fully set forth the construction and advantages of this invention to those skilled in the art to which such a device relates, so that further detailed description will not be required.

What is claimed is:

1. A tire retreading machine comprising a supporting structure, a lower ring member carried by said structure, a sectional matrix resting on said ring member, means for heating said matrix, an upper ring member engaging with the matrix, means for hingedly mounting the upper ring member, lugs formed on the matrix and arranged adjacent the ends of the sections and having oppositely arranged beveled faces, jaws on said ring members and having beveled faces to match the beveled faces of the lugs, clamping means for said jaws to cause the latter to coact with the lugs in the contraction of the matrix, and means engageable with the matrix to raise and expand the latter when freed by the jaws, said matrix riding upon the jaws of the lower ring member during its elevation and expansion.

2. A tire retreading machine comprising a supporting structure, a lower ring member carried by said structure, a sectional matrix resting on said ring member, means for heating said matrix, an upper ring member engaging with the matrix, means for hingedly mounting the upper ring member, lugs formed on the matrix and arranged adjacent the ends of the sections and having oppositely arranged beveled faces, jaws on said ring members and having beveled faces to match the beveled faces of the lugs, clamping means for said jaws to cause the latter to coact with the lugs in the contraction of the matrix, push members slidably connected to the lower ring member and engaging the under face of the matrix, a pivotally mounted operating lever pivotally connected to said push members to raise and expand the matrix when freed by the clamping means, said matrix riding upon the jaws of the lower ring member during its elevation and expansion.

3. A tire retreading machine comprising a supporting structure, a lower ring member carried by the supporting structure, a sectional matrix resting on said ring member, an upper ring member engaging with the matrix, lugs formed on the matrix and having oppositely beveled faces, arms formed on said ring members and having portions inclined to match the faces of certain of said lugs, jaws on said ring members and having faces to match the faces of the other lugs, clamping means for joining the arms of the upper and lower ring members, and clamping means for said jaws.

4. A tire retreading machine comprising a supporting structure, a lower ring member carried by said structure, a sectional matrix resting on said ring member, an upper ring member to engage with the matrix, means for mounting the upper ring member for movement toward and from the matrix, clamping means for connecting the sections of the matrix, slotted guide plates secured on the lower ring member, push rods slidable in said plates and engaging the matrix, a pivotally mounted operating lever, a plate carried by said lever, and ball and socket joints connecting said push rods to said last-named plate.

WALTER G. RAWLS.
VAUGHN RAWLS.